(12) United States Patent
Choti et al.

(10) Patent No.: US 8,272,032 B2
(45) Date of Patent: Sep. 18, 2012

(54) MULTIPLE USER LOGIN DETECTION AND RESPONSE SYSTEM

(75) Inventors: Joseph Francis Choti, Stockton, NJ (US); Justin Alexander Shaffer, New York, NY (US); Christopher Sun, New York, NY (US); Elangovan Soundararajan, Fords, NY (US); Shadeed S. Willis, Jersey City, NJ (US); Lincoln Hochberg, Hoboken, NJ (US); Sean Curtis, Rockville Center, NY (US)

(73) Assignee: MLB Advanced Media, L.P., New York, NY (US)

( * ) Notice: Subject to any disclaimer, the term of this patent is extended or adjusted under 35 U.S.C. 154(b) by 2464 days.

(21) Appl. No.: 10/985,334

(22) Filed: Nov. 10, 2004

(65) Prior Publication Data

US 2006/0098795 A1    May 11, 2006

(51) Int. Cl.
G06F 7/04 (2006.01)
G06F 17/30 (2006.01)
H04L 29/06 (2006.01)
H04L 9/32 (2006.01)

(52) U.S. Cl. .................. 726/2; 726/9; 726/20; 713/158; 713/159; 713/172

(58) Field of Classification Search .................. 726/3, 2, 726/9, 20; 713/158, 159, 172
See application file for complete search history.

(56) References Cited

U.S. PATENT DOCUMENTS

| | | | | |
|---|---|---|---|---|
| 5,842,176 A | * | 11/1998 | Hunt et al. | 705/5 |
| 6,058,301 A | | 5/2000 | Daniels | |
| 6,601,170 B1 | * | 7/2003 | Wallace, Jr. | 713/168 |
| 6,606,659 B1 | * | 8/2003 | Hegli et al. | 709/225 |
| 6,735,429 B1 | | 5/2004 | Adamany et al. | |
| 7,089,585 B1 | * | 8/2006 | Dharmarajan | 726/8 |
| 7,185,364 B2 | * | 2/2007 | Knouse et al. | 726/8 |
| 2002/0087894 A1 | | 7/2002 | Foley et al. | |
| 2003/0159068 A1 | | 8/2003 | Halpin et al. | |
| 2003/0169881 A1 | | 9/2003 | Niedermeyer | |
| 2004/0010607 A1 | | 1/2004 | Lee et al. | |
| 2004/0098313 A1 | | 5/2004 | Agrawal et al. | |
| 2004/0153365 A1 | | 8/2004 | Schneider et al. | |
| 2005/0254514 A1 | * | 11/2005 | Lynn | 370/450 |
| 2008/0009267 A1 | * | 1/2008 | Ramos Robles et al. | 455/411 |

* cited by examiner

Primary Examiner — Mohammad W Reza
(74) Attorney, Agent, or Firm — Foley & Lardner LLP

(57) ABSTRACT

A method is provided for controlling multiple access to a network service to prevent fraudulent use of the network service. The method includes identifying an account access counter for an account using identification information received from a user at a first device using a network, wherein the user is requesting access to a service provided at a second device, and further wherein the account access counter is the number of service access sessions active for the account; comparing the account access counter to a maximum account access number, wherein the maximum account access number defines a maximum number of service access sessions allowed for the account; and providing the user at the first device access to the service at the second device if the account access counter is less than the maximum account access number.

12 Claims, 6 Drawing Sheets

MULTIPLE USER LOGIN DETECTION AND RESPONSE SYSTEM

FIELD OF THE INVENTION

The present invention is related generally to the prevention of fraudulent use of online services. More specifically, the present invention relates to a method of controlling access to a network service.

BACKGROUND OF THE INVENTION

The Internet is a wide area network that connects hundreds of thousands of computers and smaller sub-networks worldwide. Businesses, government bodies and entities, educational organizations, and individuals publish information or data organized in the form of websites. A website may comprise multiple web pages that display a specific set of information and may contain links to other web pages with related or additional information. Some web pages include multiple web pages that are displayed together in a single user interface window. Each web page is identified by a Uniform Resource Locator (URL) that includes the location or Web address of the computer that contains the resource to be accessed in addition to the location of the resource on that computer.

While web pages offer a host of information and services, not every service provider can offer web pages to which the public has unrestricted access. Online banking, subscription services, online medical records, online academic records, e-mail accounts, select government web sites, and confidential company web pages are just a few examples of areas where access by the general public to a network service generally is restricted. One way to facilitate restricted access is for service providers to require that individuals attempting to access a restricted website use a login identification (ID) procedure that generally includes a username and a password.

Additionally, some websites require membership including a paid subscription to access various services. Members are provided with identification information to allow access to the website and the subscription feature. A problem associated with this procedure is the fraudulent use of account information by the approved user. For example, a user may have a valid login ID and password to a subscription service for which the user pays a fee. The user may distribute their valid login information to others such that multiple users have access to the service while only one subscription fee has been paid. This fraudulent access to a network service is not remedied by anti-hacker methods of security.

Multiple login by unapproved users can cause many problems for service providers, other approved users of the service, and even for the approved user that distributes their account information. Service providers lose money if the fraudulently entered service is a subscription service for which only one fee is paid. If the website is, for example, a secure business website, the business may lose the confidentiality of valuable or extremely sensitive information. Additionally, congestion and/or overload of a provider's server may occur if more users than the server can handle are simultaneously accessing the service. For example, a provider may have 1,000 users with valid accounts who are permitted access to a network service. Knowing the number of valid users, the service provider may ensure that if 1,000 users are simultaneously accessing the service there will be no overload, slow service, or other server related problems. However, if due to fraudulent distribution of access information the number of users exceeds 1,000, provision of the service may become slow or even unavailable. Such disruption injures the providers reputation and interferes with the service access of valid users.

Access to the service by unapproved users may also have adverse effects for the user that fraudulently distributes the login information. Users may not be fully cognizant of the fact that other individuals possessing the user's login information may have access not only to the service, but to personal information. If the service is a subscription service payable by credit card, an individual with the user's login information may be able to view and to change the credit card information. Individuals with the user's account information may also be able to make account changes and incur additional fees to the user's account. Users may not realize these potential pitfalls when they provide others with their account information.

Prior systems have restricted access to the network service by identifying if a user is already accessing the service and disallowing a second access. Thus, prior systems do not allow multiple access to a network service from a single user account. However, a user may access a service, for example, from a work computer and later in the same day access the service from a home computer without logging out of the service before leaving work. Prior systems that control access to a network service do not allow the user multiple access to the service causing significant inconvenience to the user. Thus, there is a need for a system that discourages the fraudulent distribution of account access information for a network service while allowing a valid user access to a service from multiple locations.

SUMMARY OF THE INVENTION

An embodiment of the invention relates to a method of controlling multiple access to a network service to prevent fraudulent use of the network service. The method includes, but is not limited to, identifying an account access counter for an account using identification information received from a user at a first device using a network, comparing the account access counter to a maximum account access number, and providing the user at the first device access to a service at a second device if the account access counter is less than the maximum account access number. The user is requesting access to the service provided at the second device. The account access counter is the number of service access sessions active for the account. The maximum account access number defines a maximum number of service access sessions allowed for the account.

Another embodiment of the invention relates to one or more computer-readable media having computer-readable instructions stored thereon that, upon execution by a processor, cause the processor to control multiple access to a network service to prevent fraudulent use of the network service. The instructions are configured to identify an account access counter for an account using identification information received from a user at a first device using a network, to compare the account access counter to a maximum account access number, and to provide the user at the first device access to a service at a second device if the account access counter is less than the maximum account access number. The user is requesting access to the service provided at the second device. The account access counter is the number of service access sessions active for the account. The maximum account access number defines a maximum number of service access sessions allowed for the account.

Another embodiment of the invention relates to a system device for controlling multiple access to a network service to prevent fraudulent use of the network service. The system device comprises a control access application, a communication interface, a memory, and a processor. The control access application includes, but is not limited to, computer code configured to identify an account access counter for an account using identification information received from a user at a first device using a network, to compare the account access counter to a maximum account access number, and to provide the user at the first device access to a service at a second device if the account access counter is less than the maximum account access number. The user is requesting access to the service provided at the second device. The account access counter is the number of service access sessions active for the account. The maximum account access number defines a maximum number of service access sessions allowed for the account. The communication interface is configured to receive the identification information from the first device. The memory is configured to store the control access application. The processor is coupled to the memory and to the communication interface and is configured to execute the control access application.

Yet another embodiment of the invention relates to a system for controlling multiple access to a network service to prevent fraudulent use of the network service. The system comprises a first device in communication with a second device using a network. The first device includes, but is not limited to, a control access application, a first communication interface, a first memory, and a first processor. The control access application includes, but is not limited to, computer code configured to identify an account access counter for an account using identification information received from a user at a second device using a network, to compare the account access counter to a maximum account access number, and to provide the user at the second device access to a service if the account access counter is less than the maximum account access number. The user is requesting access to the service. The account access counter is the number of service access sessions active for the account. The maximum account access number defines a maximum number of service access sessions allowed for the account. The first communication interface is configured to receive the identification information from the second device. The first memory is configured to store the control access application. The first processor is coupled to the first memory and to the first communication interface and is configured to execute the control access application.

The second device includes, but is not limited to, a second application, a second communication interface, a second memory, and a second processor. The second application includes, but is not limited to, computer code configured to prompt the user for the identification information and to present the service to the user. The second communication interface is configured to send the identification information to the first device and to receive information relating to the service from the first device. The second memory is configured to store the second application. The second processor is coupled to the second memory and to the second communication interface and is configured to execute the second application.

Yet another embodiment of the invention relates to a method of controlling multiple access to a network service to prevent fraudulent use of the network service. The method includes, but is not limited to, sending identification information from a first device to a second device using a network and receiving the service at the first device if the account access counter is less than a maximum account access number. The identification information identifies an account for a service. The account has an account access counter that is the number of service access sessions active for the account. The maximum account access number defines a maximum number of service access sessions allowed for the account.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

FIG. 5 is a diagram of an access state table in accordance with an example embodiment of the present invention.

DETAILED DESCRIPTION OF THE PREFERRED EMBODIMENTS

Embodiments of the current invention allow a service provider to control access to multiple users attempting to access a service with identification information associated with a single account. Prior systems determine if the user attempting to access the service is already accessing the service. If the user is already accessing the service, the user is not allowed access to the service a second time. However, a user may access a service, for example, from a work computer and later in the same day from a home computer without logging out of the service before leaving work. Prior systems that control access to a service do not allow the user to access the service multiple times. As a result, the user may not be allowed access to the service at home. The account may be a banking account to which the user needs immediate access. The user then would be required to return to work to exit the service before being allowed to access the account again.

The present invention provides control of the access to a service through a single account while also allowing the user to have multiple simultaneous active service access sessions. In one embodiment, the user is assigned a maximum account access number. The maximum account access number defines a maximum number of service access sessions allowed for the account. A validation procedure is executed to ensure that the user is not exceeding the maximum account access number with the current access attempt. Thus, the user may be allowed to access the service from both a work computer and a home computer without logging out from the service. In addition, an identification cookie placement procedure may be used as a convenience to the user. The identification cookie placement procedure allows a user to access a service multiple times from the same device without affecting the maximum account access number if the access attempts are made within a predetermined access time period after the identification cookie is placed on the user's computer. The access time period represents a time interval during which the user is allowed access to the service from the user's computer.

Figure 1:
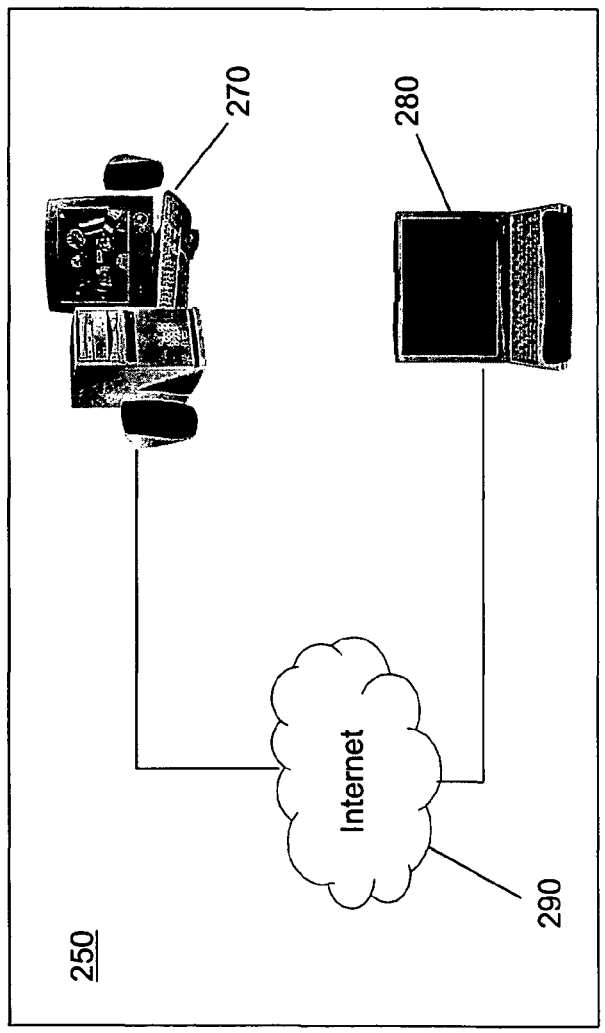
FIG. 1 is a diagram of a system in accordance with an example embodiment of the present invention.

FIG. 1 is a diagram of a system in accordance with an example embodiment. The system 250 is comprised of multiple devices that can communicate through a network. For example, as shown with reference to FIG. 1, the system 250 includes a first device 280 that accesses a service provided at a second device 270 through the Internet 290. To access the service provided by the second device 270, a user at the first device 280 sends identification information to identify the account associated with use of the service. The second device 270 monitors the number of active service access sessions currently provided through the account to determine if the user at the first device 280 is provided access to the service.

The system 250 may comprise any combination of wired or wireless networks including, but not limited to, a cellular telephone network, a wireless Local Area Network (LAN), a Bluetooth personal area network, an Ethernet LAN, a token ring LAN, a wide area network, the Internet 290, etc. The system 250 may include both wired and wireless devices. For exemplification, the system 250 shown in FIG. 1 includes the Internet 290. Connectivity to the Internet 290 may include, but is not limited to, long range wireless connections, short range wireless connections, and various wired connections including, but not limited to, telephone lines, cable lines, power lines, digital cable, etc. The system 250 shown in FIG. 1 in an exemplary embodiment includes a desktop computer 270 and a notebook computer 280. The devices may include computers of any form factor, a Messaging Device (MD), a Personal Digital Assistant (PDA), and/or a cellular telephone. The system 250 may include additional devices and devices of different types as well as any combination of these devices.

Figure 2:
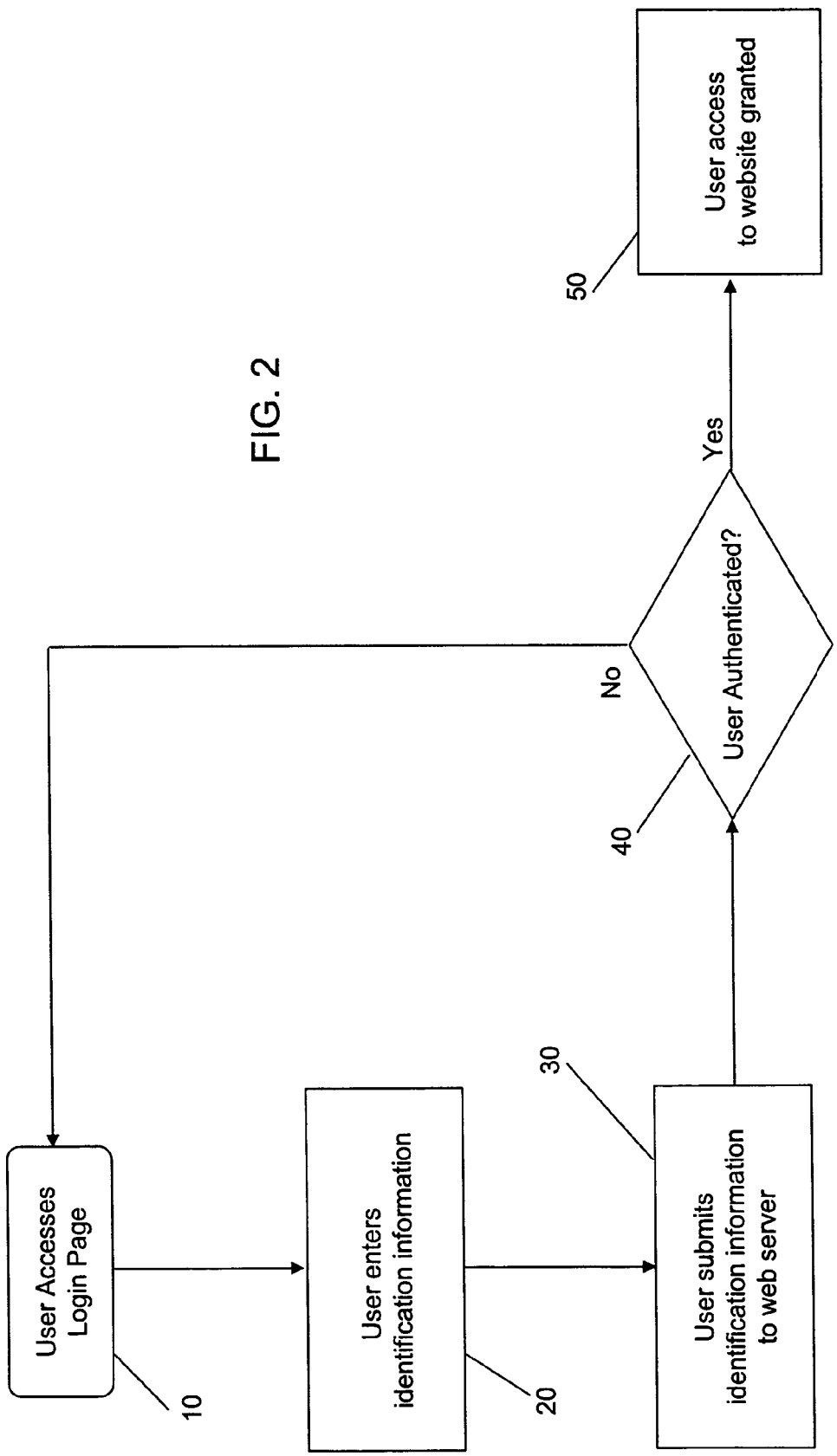
FIG. 2 is a flow chart illustration of a user validation procedure in accordance with an example embodiment of the present invention.

FIG. 2 shows a flow chart illustrating a validation procedure that identifies the account that the user is attempting to access. A user begins the process by accessing a login web page 10 presented at the first device 280 and provided by a web server at the second device 270. In an operation 20, the user enters identification information that may include a user ID and a password. First time users may be required to provide personal information and to select the user ID and/or the password before being allowed to continue. The user submits the identification information to the service provider in an operation 30. A test is implemented in an operation 40 to determine if the identification information authenticates the user. For example, if the submitted user identification information matches the information stored in a database for a known valid user of the service, the user is authenticated. If not, the user is redirected back to the login web page 10 or to an error page and may try to log in again. If the user is successfully authenticated, the user is provided access to the service provided at the second device 270.

Figure 3:
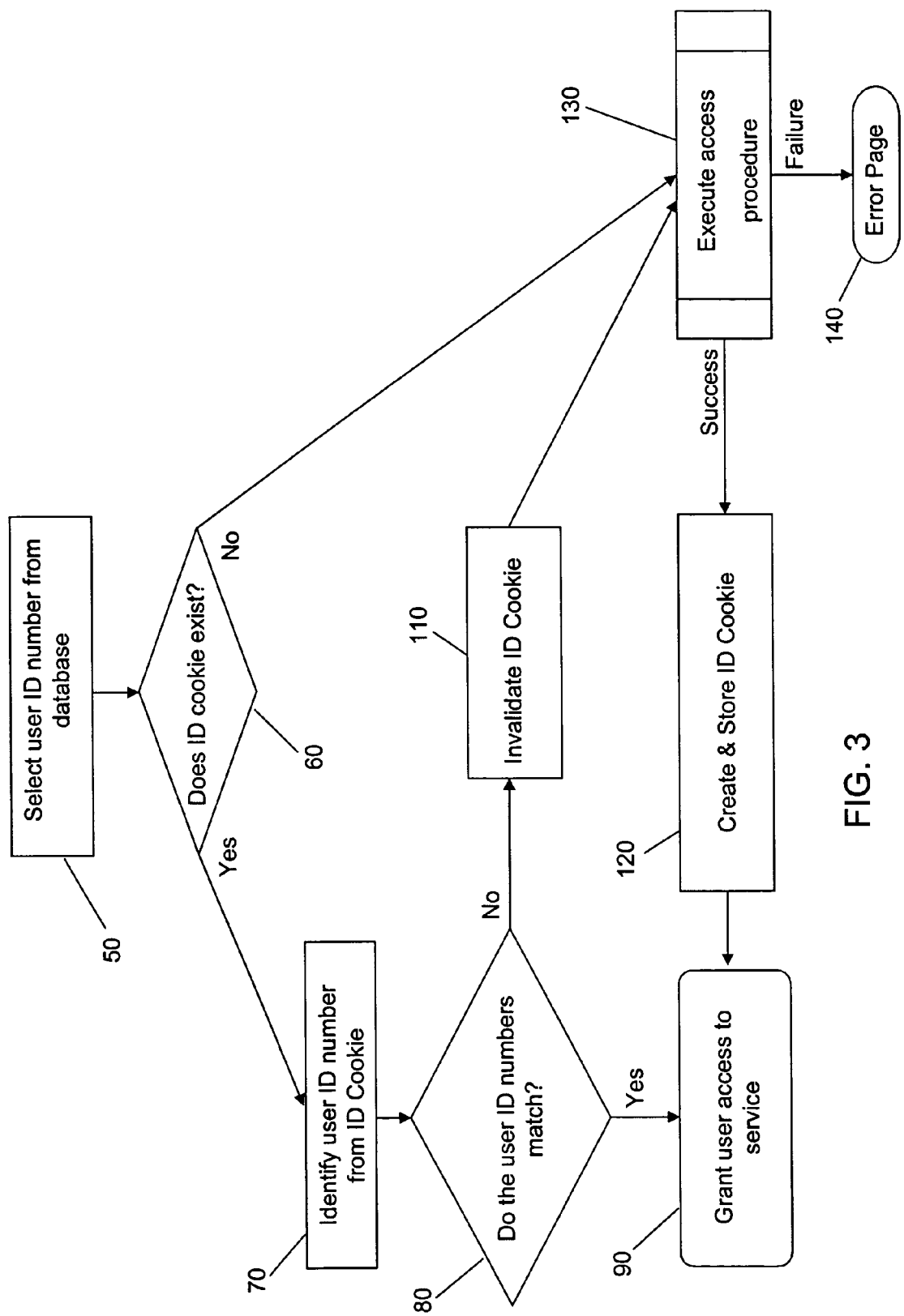
FIG. 3 is a flow chart illustration of an identification cookie placement procedure in accordance with an example embodiment of the present invention.

Upon successful completion of the validation procedure of FIG. 2, an ID cookie placement procedure is implemented in an exemplary embodiment. FIG. 3 shows a flow chart illustrating the ID cookie placement procedure in accordance with an example embodiment. The purpose of the procedure is to allow a user direct access to the service if the user has accessed the service from the same device within a predetermined access time period after the identification cookie is placed on the first device 280. An ID cookie contains the identification information for the account and is placed on the first device 280 when the user successfully accesses the service. A user ID number may be associated with the identification information in a database accessible from the second device 270. The user ID number allows the service provider to identify each of its users with a single parameter. Thus, when information relative to the account is needed, the user ID number is used to query for data associated with the account. In an exemplary embodiment, the ID cookie remains valid for a time period determined by the service provider. When the predetermined access time period expires, the cookie deletes itself from the first device 280.

With reference to FIG. 3, in an operation 50, the user ID number is selected from a database at the second device 270 using the identification information sent from the first device 280. Thus, the identification information is associated with the user ID number. In an operation 60, a test determines if a valid ID cookie is located at the first device 280. If a valid ID cookie exists, a user has accessed the service provided at the second device 270 from the first device 280 within the access time period defined by the service provider. The user ID number associated with the ID cookie is identified from the ID cookie in an operation 70 if the ID cookie exists. In an operation 80, a test determines if the user ID number selected from the database in operation 50 matches the user ID number identified from the ID cookie in operation 70. Thus, the comparison 80 determines whether the user currently attempting to access the service is the same as the user that last accessed the service from the first device 280.

If the comparison 80 indicates that the user ID numbers are the same, the user is granted access to the service in an operation 90. This process ensures that a user can log in multiple times from the same computer with the same account without having to worry about exceeding a maximum account access number. If the comparison 80 indicates that the user ID numbers are different, the ID cookie on the first device 280 is invalidated in an operation 110. In an alternative embodiment, operation 110 may not be implemented to allow multiple cookies to reside on the first device 280 so that users with different accounts may use the same device to access the service.

Figure 4:
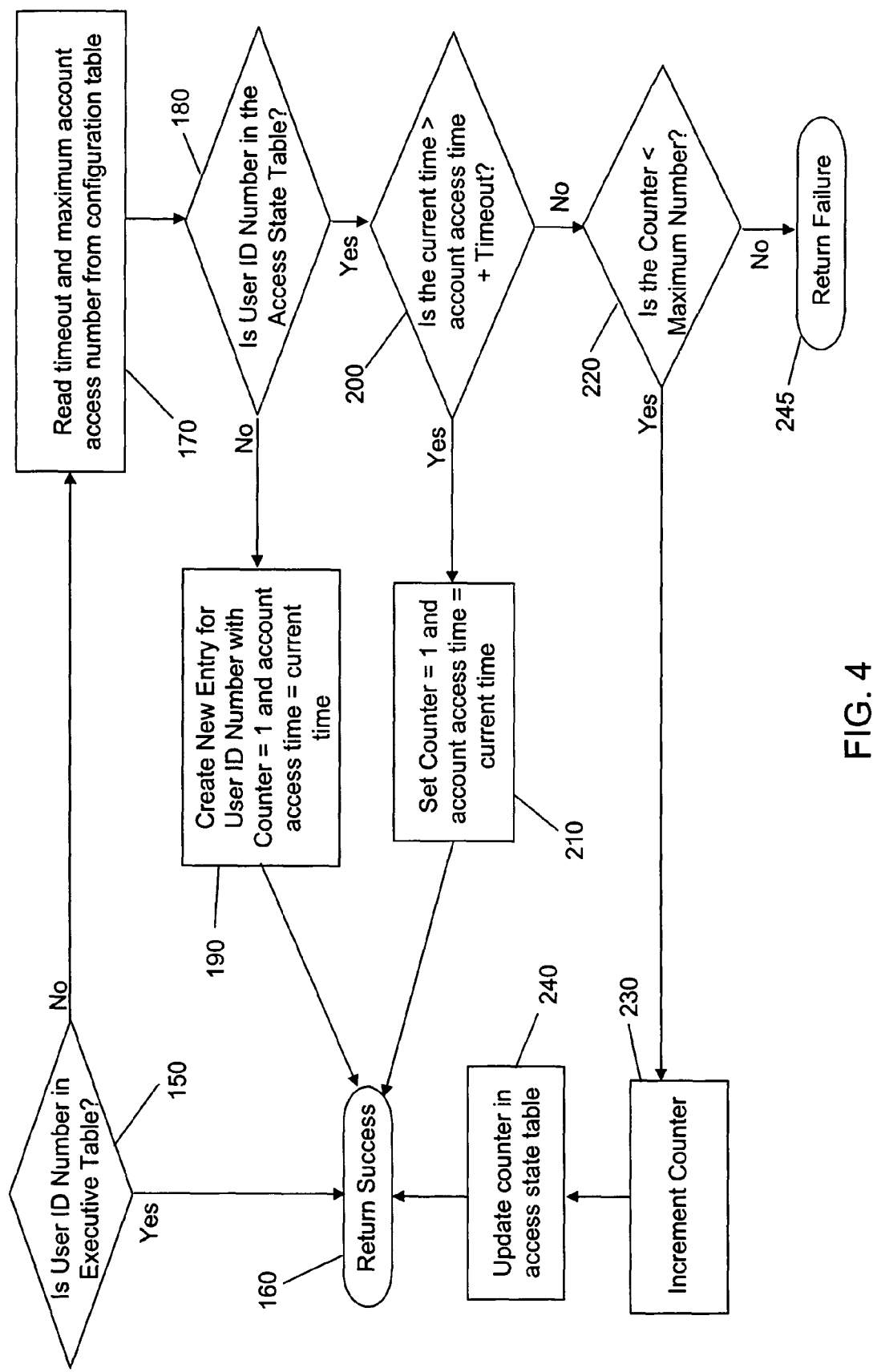
FIG. 4 is a flow chart illustration of an access procedure for determining accessibility in accordance with an example embodiment of the present invention.

If the ID cookie on the computer is invalidated in an operation 110 or it is determined in operation 60 that an ID cookie does not exist on the first device 280, an access procedure is executed in an operation 130 as discussed further with reference to FIG. 4. If the stored validation procedure 130 returns a success, a new ID cookie is created and stored on the first device 280 in an operation 120. The ID cookie contains the user ID number selected from the database using the identification information. After placement of the ID cookie on the first device 280, the user is granted access to the service in an operation 90. The ID cookie, in an exemplary embodiment, deletes itself after the access time period expires causing execution of the access procedure in the operation 130. Thus, the access time period represents a time interval during which the user is allowed access to the service at the first device without execution of the access procedure to determine if the user is allowed access to the service. If the stored validation procedure 130 returns a failure, the user is directed to an error page in an operation 140 and access to the service is denied.

The access procedure 130 determines whether the current access attempt exceeds the maximum account access number allowed for a user through a single account. In one embodiment, when a user successfully logs in to a service, an entry is created for the user in an access state table. The access state table entry contains, for example, the user ID number and an account access time designating the time at which the user successfully accessed the service provided at the second device 270. When a user subsequently attempts to access the service, the access state table is searched for the user ID number. If the user ID number is found, a determination of whether a user continues to access the service is performed. If the user continues to access the service, an account access counter is compared to the maximum account access number to determine whether the access procedure returns a success or a failure.

FIG. 4 is a flow chart illustrating the access procedure of operation 130 in detail in an exemplary embodiment. In an operation 150, an executive table is searched to determine if the access procedure should return a success regardless of the number of active access sessions through the account. An executive table may contain a list of user ID numbers of individuals who are not subject to access restriction. For example, such users may include, but are not limited to, employees of the service provider, users who pay a higher fee for executive status, or complementary account holders. If a user ID number is found in the executive table in the operation 150, the access procedure returns a success in an operation 160. If the user ID number is not found in the executive table in the operation 150, a timeout value and the maximum account access number are read from a configuration table in an operation 170. The timeout value represents a time interval during which access to the account is controlled. The timeout value and the maximum account access number may be defined in the configuration table as single values applied to all user accounts. In an alternative embodiment, the configuration table may be searched by checking the table for an entry corresponding to the user ID number that is associated with the identification information provided by the user during the authentication procedure. Thus, in this embodiment, each account may have a different timeout value and the maximum account access number. In yet another alternative embodiment, different account levels may be defined that allow a different timeout value and a different maximum account access number for each account level.

The configuration table may contain information about other limitations on a user's account. The maximum account access number is the maximum number of service access sessions allowed for the account. For example, if the maximum account access number is two, the user may access the service from two different devices, but not a third, possibly until the timeout period defined by the timeout value expires.

The access state table is searched in an operation 180 using the user ID number that has been determined from the identification information. Each account is thereby associated with a unique user ID number. An exemplary embodiment of an access state table is shown with reference to FIG. 5. The access state table 440 includes, but is not limited to, a user ID number 442, an account access time 444, and an account access counter 446 for each entry 450, 452, 454, 456. The account access time 444 is the time that the account is accessed by the user. The account access time 444 may include the date in addition to a time. For example, the account access time 448 associated with user ID number 06774592 includes the date Oct. 26, 2004 as 2004:10:26 and the time 1:38:14 pm as 13:38:14. Alternatively, the date may be included in a separate field. In another alternative embodiment, the date may not be included in the access state table 440. The account access counter 446 is the number of service access sessions active for the account. The access state table 440 may contain a list of all users and the information concerning the user's last access to the service. Alternatively, the access state table 440 may contain a list of user ID numbers 442 corresponding to users who have recently accessed the service. The table entries may be removed from the access state table when the user exits the service or may be removed on a periodic basis to reduce the size of the access state table 440. In an exemplary embodiment, the access state table maintains a single entry for each user ID number and thus account. If another user is allowed access to the service using the same identification information, the account access time 444 of the user ID number associated with the identification information may be updated with the current time.

If the user ID number is not in the access state table 440, the user does not have any active service access sessions. A new session is created and a new entry placed in the access state table 440 in an operation 190. The new entry is associated with the user ID number. The account access counter 446 is assigned a value of one. The account access time 444 is assigned a value of the current time. Upon entry in the access state table 440, the access procedure returns a success in the operation 160. In an alternative embodiment, the access state table 440 may be searched before user account limitations are obtained from the configuration table in operation 170.

If the user ID number is found in the access state table 440 in the operation 180, a test may be performed to determine if the session listed in the table remains active. An active session is a session that is still valid based on the rules defined in the configuration table (i.e. a two hour timeout value means that a user accessing the service again after one hour has an active session). In an operation 200, this test is performed by comparing the current time to the account access time 444 obtained from the access state table 440 in the operation 180 and the timeout value obtained from the configuration table in the operation 170. If the current time exceeds the sum of the account access time and the timeout value, the session listed in the access state table is no longer active. In this case, the entry in the access state table corresponding to the user ID number is set, in an operation 210, such that the account access counter is assigned a value of one and the account access time is assigned a value of the current time. Thus, the account access counter and the account access time are reset. As a result, the access to the service through the account is controlled during the timeout value selected by the service provider.

If the current time does not exceed the sum of the account access time and the timeout value, the prior login session is still active. In this case, the account access counter 446 obtained from the access state table in the operation 180 is compared, in an operation 220, to the maximum account access number obtained from the configuration table in operation 170. If the account access counter 446 is not less than the maximum account access number, the access procedure returns a failure in an operation 245. If the account access counter 446 is less than the maximum account access number, the account access counter 446 is incremented in an operation 230. The incremented account access counter is stored in the access state table in an operation 240. Thus, the existing account access counter for the user ID number is updated with the incremented value. The account access time 444 may additionally be updated with the current time in an alternative embodiment. The access procedure returns a success in the operation 160.

Figure 6:
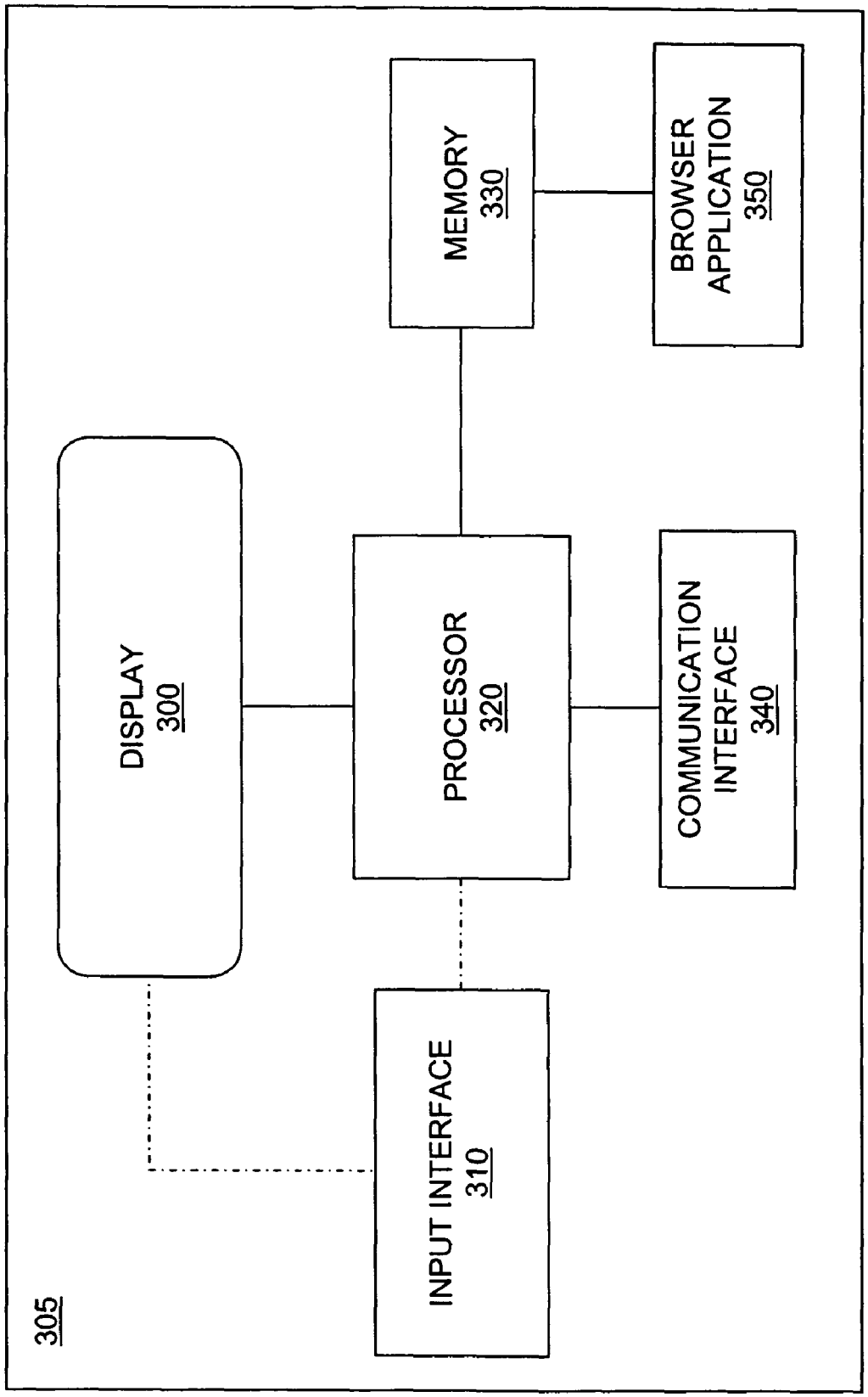
FIG. 6 is a block diagram of a client device for use in the system of FIG. 1 in accordance with an example embodiment of the present invention.

For exemplification, FIG. 6 shows a block diagram of an example first device 280 that may be included in the system 250. The device 305 includes a display 300, a communication interface 340, an input interface 310, a memory 330, a processor 320, and a browser application 350. The device 305 may or may not be mobile. Also, different and additional components may be incorporated into the device 305. The device 305, for example, allows a user to connect to a network, such as the Internet 290, and to view and/or to hear media data using a variety of formats. The components of the device 305 may each be internal or external to the device 305.

The components may connect to each other using a number of different methods as known to those skilled in the art. Connections between the components of device 305 may be other than or in addition to those shown in FIG. 6.

The display 300 presents information to the user of the device 305 including, but not limited to, information from the browser application 350. The display may be, but is not limited to, a thin film transistor (TFT) display, a light emitting diode (LED) display, a Liquid Crystal Display (LCD), a Cathode Ray Tube (CRT) display, etc.

The communication interface 340 provides an interface for receiving and transmitting calls, messages, and/or any other information communicated across a network including, but not limited to, streaming media and multimedia messages. Communications between the device 305 and the network may be through one or more of the following connection methods, without limitation: an infrared communications link, a wireless communications link, a cellular network link, a physical serial connection, a physical parallel connection, a link established according to the Transmission Control Protocol/Internet Protocol (TCP/IP), etc. Communications between the device 305 and the network may use one or more of the following communication protocols, without limitation: HTTP: HTTP, TCP/IP, real time streaming protocol (RTSP), real time protocol (RTP), user datagram protocol (UDP), multicast UDP, etc. Transferring content to and from the device 305 may use one or more of these connection methods and communication protocols or any others known to those skilled in the art or to be developed in the future.

The input interface 310 provides an interface for receiving information from the user for entry into the device 305. The input interface 310 may use various input technologies including, but not limited to, a keyboard, a pen and touch screen, a mouse, a track ball, a touch screen, a keypad, one or more buttons, etc. to allow the user to enter information into the device 305 or to make selections from the device 305. The input interface 310 may provide both an input and an output interface. For example, a touch screen display allows the user to make selections and presents information to the user.

The memory 330 provides an electronic holding place for an operating system of the device 305, the browser application 350, and/or other applications. The device 305 may have a plurality of memory devices 330 that use the same or different memory technologies. Example memory technologies include, but are not limited to, Random Access Memory (RAM), Read Only Memory (ROM), flash memory, etc. A variety of different storage media may be used for each memory technology. For example, a Compact Disk (CD), a Digital Video Disk (DVD), and a hard disk are all ROM storage media types.

The processor 320 executes instructions that cause the device 305 to perform various functions. The instructions may be written using one or more programming languages, scripting languages, assembly languages, etc. Additionally, the instructions may be carried out by a special purpose computer, logic circuits, or hardware circuits. Thus, the processor 320 may be implemented in hardware, firmware, software, or any combination of these methods. The term "execution" refers to the process of running an application or program or the carrying out of the operation called for by an instruction. The processor 320 executes an application, meaning that it performs the operations called for by that application in the form of a series of instructions. The processor 320 may retrieve an application from a non-volatile memory that is generally some form of ROM or flash memory and may copy the instructions in an executable form to a temporary memory that is generally some form of RAM. The processor 320, for example, may execute instructions embodied in the browser application 350. The device 305 may include one or more processor 320.

The browser application 350 may communicate with one or more web server. The browser application 350 may respond to HTTP commands, may interpret hyper text markup language and other Internet programming languages including, but not limited to, Java™ and Perl, and may present a web page for viewing by the user. The browser application 350 may display or otherwise process media data or media streams or provide access to other services through a network accessed through the communication interface 310.

Figure 7:
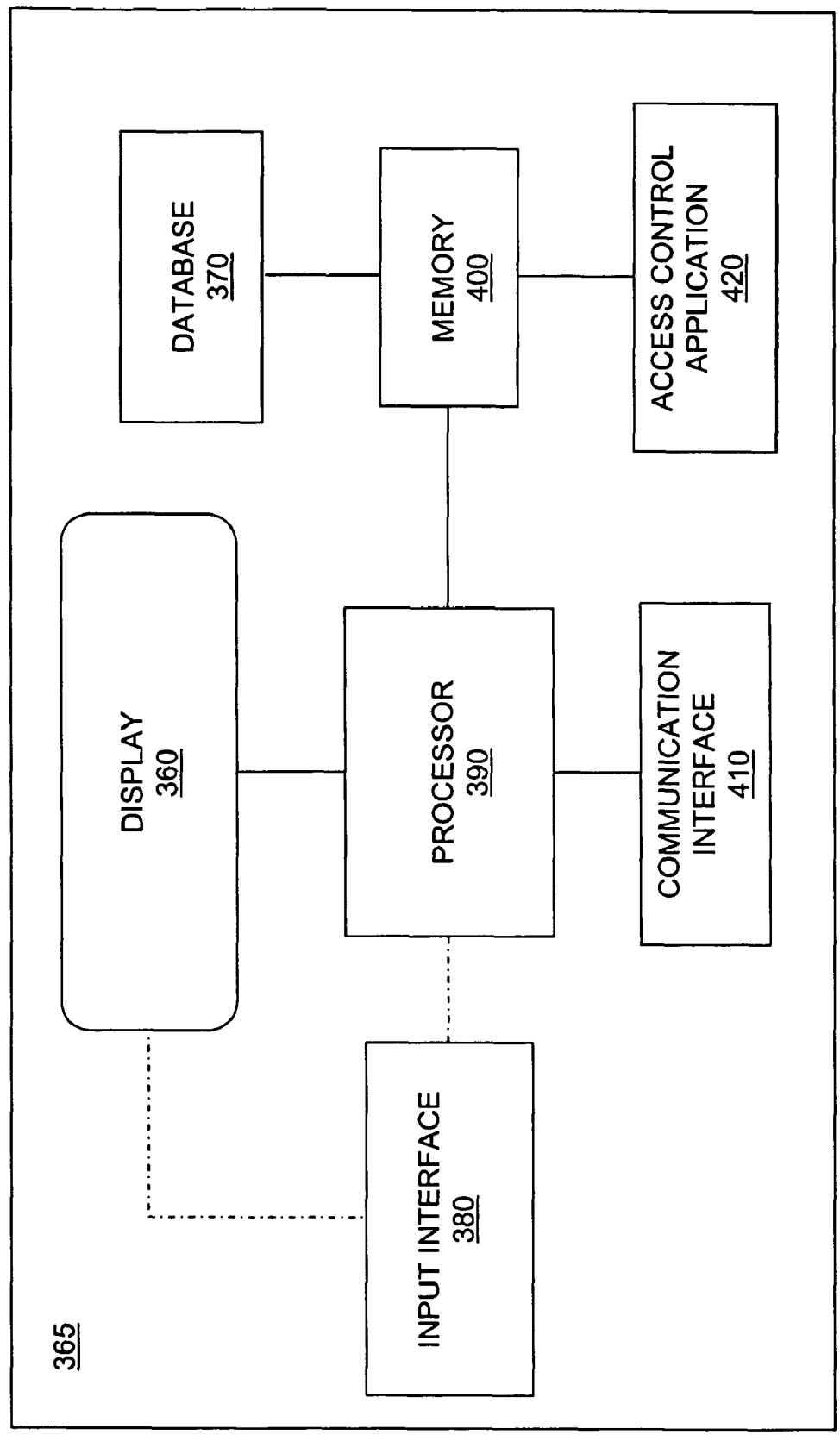
FIG. 7 is a block diagram of a server device for use in the system of FIG. 1 in accordance with an example embodiment of the present invention.

For exemplification, FIG. 7 shows a block diagram of a device 365 that includes a display 360, a communication interface 410, an input interface 380, a memory 400, a processor 390, an access control application 420, and a database 370. Different and additional components may be incorporated into the device 365. The device 365 communicates website service information to the device 305. The components of device 365 may each be internal or external to the device 365. The components may connect using a number of different methods as known to those skilled in the art. Connections may be other than or in addition to those shown in FIG. 7.

The display 360 presents information to the user of the device 365 including, but not limited to, information from the access control application 420. The display may be, but is not limited to, a TFT display, an LED display, an LCD, a CRT display, etc. The display 360 is optional.

The communication interface 410 provides an interface for receiving and transmitting calls, messages, and/or any other information communicated across a network including streaming media and multimedia messages. Communications between the device 365 and the network may be through one or more of the following connection methods, without limitation: an infrared communications link, a wireless communications link, a cellular network link, a physical serial connection, a physical parallel connection, a link established according to the TCP/IP Standards, etc. Communications between the device 365 and the network may use one or more of the following communication protocols, without limitation: HTTP, TCP/IP, RTSP, RTP, UDP, multicast UDP, etc. Transferring content to and from the device 365 may use one or more of these connection methods and communication protocols or any others known to those skilled in the art or to be developed in the future.

The input interface 380 may provide an interface for receiving information from the user for entry into the device 365. The input interface 380 may use various input technologies including, but not limited to, a keyboard, a pen and touch screen, a mouse, a track ball, a touch screen, a keypad, one or more buttons, etc. to allow the user to enter information into the server device 365 or to make selections from the server device 365. The input interface 380 may provide both an input and an output interface. The input interface 380 is optional.

The memory 400 provides an electronic holding place for an operating system of the device 365, the access control application 420, the database 370, and/or other applications so that the information can be reached quickly by the processor 390. The device 365 may have a plurality of memory devices 400 that may use different memory technologies including, but not limited to, RAM, ROM, flash memory, etc.

The processor 390 executes instructions that cause the device 365 to perform various functions. The instructions may be written using one or more programming languages, scripting languages, assembly languages, etc. Additionally, the instructions may be carried out by a special purpose computer, logic circuits, or hardware circuits. Thus, the processor 390 may be implemented in hardware, firmware, software, or any combination of these methods. The processor 390 executes an application meaning that it performs the operations called for by that application in the form of a series of instructions. The processor 390 may retrieve an application from a non-volatile memory that is generally some form of ROM or flash memory and may copy the instructions in an executable form to a temporary memory that is generally some form of RAM. The processor 390 may execute instructions embodied in the access control application 420. The device 365 may include one or more processor 390.

The access control application 420 provides the functions discussed with reference to FIG. 3 and FIG. 4. The access control application 420 may interface with a web server application to control access to services provided by the web server application. The access control application 420 is comprised of instructions interpretable by the processor 390 as known to those skilled in the art. In an exemplary embodiment, the access control application 420 is implemented using the Java programming language and Structured Query Language scripts to extract information from the database 370 and to determine the user access to the services provided by the web server application. The web server application responds to HTTP commands and may transmit one or more web page to the device 305 based on the user selection at the device 305. The access control application 420 may be implemented on the same or a different device from the web server application that provides the service to the user.

The database 370 may store web pages and information associated with the web pages including media data. The database may utilize various database technologies as known to those skilled in the art including a simple file system and/or a system of tables. The database 370 also may use a variety of different formats as known to those skilled in the art. The device 365 may include a plurality of databases 370. The database 370 also may be used to store information such as the identification information, the user identification number, the configuration table, and the access state table. The device 365 may include one or more database 370.

It is understood that the invention is not confined to the particular embodiments set forth herein as illustrative, but embraces all such modifications, combinations, and permutations as come within the scope of the following claims. The description above focused on a preferred embodiment of the invention designed to control access to multiple users attempting to access a service using the same account information. The present invention, however, is not limited to a particular application. Also, the present invention is not limited to a particular operating environment. Those skilled in the art will recognize that the system and methods of the present invention may be advantageously operated on different platforms using different operating systems including but not limited to the Microsoft® Windows based operating system, Macintosh® operating system, LINUX based operating systems, or UNIX® based operating systems. Additionally, the functionality described may be distributed among modules that differ in number and distribution of functionality from those described herein without deviating from the spirit of the invention. Additionally, the order of execution of the modules may be changed without deviating from the spirit of the invention. Thus, the description of the preferred embodiments is for purposes of illustration and not limitation.

What is claimed is:

1. A method of controlling multiple access to a network service to prevent fraudulent use of the network service, the method comprising:

identifying an account access counter for an account using identification information received from a user at a first device using a network, wherein the user is requesting access to a service provided at a second device, and further wherein the account access counter is the number of service access sessions simultaneously active for the account;

comparing the account access counter to a maximum account access number, wherein the maximum account access number defines a maximum number of service access sessions allowed for the account; and providing the user at the first device access to the service at the second device if the account access counter is less than the maximum account access number.

2. The method of claim 1, further comprising:

determining if an identification cookie is stored at the first device; and allowing the user to access the service at the second device if the identification cookie is stored at the first device.

3. The method of claim 2, further comprising:

creating the identification cookie if the identification cookie is not stored at the first device, wherein the identification cookie includes the identification information; and sending the created identification cookie to the first device.

4. The method of claim 2, wherein the identification cookie is deleted at the first device after expiration of an access time period, wherein the access time period represents a time interval during which the user is allowed access to the service at the second device.

5. The method of claim 1, wherein identifying the account access counter comprises:

searching an access state table for an entry associated with the identification information; and obtaining the account access counter from the entry associated with the identification information.

6. The method of claim 5, further comprising:

incrementing the account access counter if the account access counter is less than the maximum account access number; and storing the incremented account access counter in the access state table associated with the identification information.

7. The method of claim 6, further comprising:

obtaining an account access time from the entry associated with the identification information; wherein the account access time is the time that the account is accessed by the user;

comparing a current time to the account access time and a timeout value, wherein the timeout value represents a time interval during which access to the account is controlled; and setting the account access counter to a value of one based on the comparison of the current time to the account access time and the timeout value.

8. The method of claim 1, further comprising:

determining if the user is an executive member; and providing the user at the first device access to the service at the second device if the user is determined to be an executive member.

9. A computer-readable memory having computer-readable instructions stored therein which when executed by a processor cause a computing device to:

identify an account access counter for an account using identification information received from a user at a first device using a network, wherein the user is requesting access to a service provided at a second device, and further wherein the account access counter is the number of service access sessions simultaneously active for the account;
compare the account access counter to a maximum account access number, wherein the maximum account access number defines a maximum number of service access sessions allowed for the account; and
provide the user at the first device access to the service at the second device if the account access counter is less than the maximum account access number.

10. A device for controlling multiple access to a network service to prevent fraudulent use of the network service, the device comprising:
an access control application, the access control application comprising computer code configured
to identify an account access counter for an account using identification information received from a user at a first device using a network, wherein the user is requesting access to a service, and further wherein the account access counter is the number of service access sessions simultaneously active for the account;
to compare the account access counter to a maximum account access number, wherein the maximum account access number defines a maximum number of service access sessions allowed for the account; and
to provide the user at the first device access to the service if the account access counter is less than the maximum account access number;
a communication interface, the communication interface configured to receive the identification information from the first device;
a memory, the memory configured to store the access control application; and
a processor, the processor coupled to the memory and to the communication interface and configured to execute the access control application.

11. A system for controlling multiple access to a network service to prevent fraudulent use of the network service, the system comprising:
a first device, the first device comprising
an access control application, the access control application comprising computer code configured
to identify an account access counter for an account using identification information received from a user at a second device using a network, wherein the user is requesting access to a service, and further wherein the account access counter is the number of service access sessions simultaneously active for the account;
to compare the account access counter to a maximum account access number, wherein the maximum account access number defines a maximum number of service access sessions allowed for the account; and
to provide the user at the second device access to the service if the account access counter is less than the maximum account access number;
a first communication interface, the first communication interface configured to receive the identification information from the second device;
a first memory, the first memory configured to store the access control application; and
a first processor, the first processor coupled to the first memory and the first communication interface and configured to execute the access control application; and
the second device comprising
a second application, the second application comprising computer code configured to prompt the user for the identification information; and
to present the service to the user;
a second communication interface, the second communication interface configured
to send the identification information to the first device; and
to receive information relating to the service from the first device;
a second memory, the second memory configured to store the second application; and
a second processor, the second processor coupled to the second memory and to the second communication interface and configured to execute the second application.

12. A method of controlling multiple access to a network service to prevent fraudulent use of the network service, the method comprising:
sending identification information from a first device to a second device using a network, wherein the identification information identifies an account for a service, the account having an account access counter that is the number of service access sessions simultaneously active for the account; and
receiving the service at the first device if the account access counter is less than a maximum account access number, wherein the maximum account access number defines a maximum number of service access sessions allowed for the account.

* * * * *